(12) United States Patent
Chaudhuri et al.

(10) Patent No.: US 6,757,243 B1
(45) Date of Patent: Jun. 29, 2004

(54) SYSTEM AND METHOD FOR SERVICE INDEPENDENT DATA ROUTING

(75) Inventors: Sid Chaudhuri, East Brunswick, NJ (US); Simon S. Zelingher, Morganville, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/311,214

(22) Filed: May 13, 1999

Related U.S. Application Data

(60) Provisional application No. 60/114,148, filed on Dec. 29, 1998.

(51) Int. Cl.[7] .............................................. G01R 31/08
(52) U.S. Cl. ...................................... 370/221; 370/216
(58) Field of Search ................................. 370/216, 221, 370/225, 226, 227, 228, 217–220, 408, 409, 238, 230, 229, 535, 498, 404, 405; 359/109, 110, 115, 113, 118

(56) References Cited

U.S. PATENT DOCUMENTS

| | | | | |
|---|---|---|---|---|
| 5,235,599 A | * | 8/1993 | Nishimura et al. | 340/2.23 |
| 6,169,754 B1 | * | 1/2001 | Sugawara et al. | 370/535 |
| 6,222,821 B1 | * | 4/2001 | Sees et al. | 340/2.23 |
| 6,282,170 B1 | * | 8/2001 | Bentall et al. | 370/225 |
| 6,377,543 B1 | * | 4/2002 | Grover et al. | 370/227 |
| 6,421,349 B1 | * | 7/2002 | Grover | 370/227 |

* cited by examiner

*Primary Examiner*—Dang Ton
*Assistant Examiner*—Phuc Tran

(57) ABSTRACT

Data are rerouted over a network having a uniform-capacity Tandem Connection by detecting a failure in a link in a path, maintaining the path through a Tandem Connection that does not include the failed link, and rerouting the data through the Tandem Connection based on information embedded in a tandem layer, and independent of the constituent payload capacities within the tandem connection.

15 Claims, 2 Drawing Sheets

SYSTEM AND METHOD FOR SERVICE INDEPENDENT DATA ROUTING

This application claims the benefit of U.S. Provisional Patent Application Serial No. 60/114,148 entitled "A System and Method for Service Independent Data Routing" and filed Dec. 29, 1998.

TECHNICAL FIELD

The present invention relates to communications on a network. In particular, the present invention relates to routing data along a Synchronous Optical Network.

BACKGROUND

Present-day optical data transport networks have high capacity and are very flexible in terms of allowing for different payload types and data rates. The combination of high capacity and high flexibility, however, gives rise to routing problems if data, for whatever reason, requires rerouting from its original path along the network. Specifically, because optical networks can carry large amounts of data at various speeds and packet sizes, present methods of rerouting are incapable of quickly and efficiently rerouting this data.

Within the field of optical networking, various standards exist for interfacing optical telephone networks. In North America, the SONET (Synchronous Optical Network) standards are used, while in Europe and most of Asia, the SDH (Synchronous Digital Hierarchy) standards are used. The SONET standards, and their SDH analogs, are used for interfacing equipment from different vendors. The SONET and SDH standards are similar; and for the purposes of this document, the term SONET includes both the SONET and SDH standards.

Several advantages are derived from using SONET. One advantage is that proprietary protocols for fiber-based digital transport have essentially been eliminated. SONET is based on the principle of direct synchronous multiplexing, which allows separate, slower signals to be multiplexed directly onto higher speed SONET signals without intermediate stages of multiplexing. Additionally, SONET provides advanced network management features, using nearly 5% of the total bandwidth. The SONET protocol is described in *American National Standard for Telecommunications— Digital Hierarchy—Optical interface rates and formats specifications (SONET)*, ANSI T1.105-1991, which is hereby incorporated by reference.

A SONET protocol stack consists of the following four layers: the photonic layer, the section layer, the line layer, and the path layer. The photonic layer relates to converting electrical signals to optical signals. The section layer relates to the transport of STS-n (Synchronous Transport Signal) frames across the physical medium. Functions include framing, scrambling, section-error monitoring and communicating and adding the section-layer overhead.

The line layer allows the path layer payload to be transported, and it provides synchronization and multiplexing for the path layer. A line is the medium required to transmit data from the originating equipment to the terminating equipment. Finally, the path layer deals with the transport and mapping of services between path terminating equipment. These services include, but are not limited to, DS1, DS3 and video. The path layer carries information for mapping these services into an STS frame.

Providing end-to-end service requires fast service provisioning, maintenance, and quality assurance. The layered architecture in SONET helps a network operator to achieve service objectives for all service paths originating and terminating within the service provider's network domain. Some SONET signals, however, originate and terminate outside a network operator's domain. The network operators do not have access to the path-terminating points for such service signal. Thus, to meet end-to-end service objectives to manage all paths within the interface originating from all inter-network paths, an optional intermediate layer called Tandem Connection Overhead has been defined in the standards. This optional Tandem Connection Overhead layer exists between the line layer and the path layer, and is a standard specified in *American National Standard for Telecommunications—Synchronous Optical Network (SONET) Tandem Connection Maintenance*, ANSI T1.105.05-1994, hereby incorporated by reference. As discussed in the standard, the Tandem Connection Overhead layer deals with the reliable transport of path-layer payload and its overhead across a network. The use of Tandem Connection is application specific and at the discretion of the carrier.

A Tandem Connection is defined in the standard as a group of N STS-1s (N is any of the allowed line rate values) that are transported and maintained together through one or more tandem line systems, with the constituent SPE (Synchronous Payload Envelope) payload capacities unaltered. Tandem Connection maintenance can be performed in a single STS-1 (where STS is the digital version of the OC standard) or on a bundle with a capacity of N STS-1s, where N is any of the allowed line rate values. The size of bundles supported is application-specific and depends on the equipment used.

Before SONET was used, Plesiochronous Digital Hierarchy (PDH) networks existed with their own type of multiplexing. The types of multiplexing performed, however, placed severe restrictions on how a high-capacity pipe could be used to transport a variety of lower order digital pipes. In the pre-SONET world (including PDH), there was only one type of signal: the DS3 signal at 45 Mbit per second. In this signal, there is no standard overhead frame. Thus, if there is a failure in the network, only one type of signal with one type of payload at one type of rate needs to be multiplexed and sorted. If, however, a variety of signals, payloads and rates exist in a SONET environment, this multiplexing and sorting is extremely difficult, and can make it very difficult to reroute data in a practical way. In this scheme, if there is a network failure, rerouting and recreating the data is extremely difficult because within a few milliseconds, the system must figure out the slots needed for alternate routes, and then must assign those slots for alternate payloads.

It is clear from the above discussion that the desirable characteristics of high capacity and flexibility provided by optical networks creates efficiency problems if data packets on an optical network need to be rerouted.

SUMMARY OF THE INVENTION

To alleviate the problems inherent in the prior art, a system and method are introduced to route data along an optical network independent of payload type. Because the routing is performed independently of payload type, the routing is deemed service independent.

In one embodiment of the present invention, a network failure is detected on a path between a first point and a second point. An alternate path on the network is established from the first point to the second point, the alternate path comprising a uniform-capacity tandem circuit. The data are then rerouted through the alternate path based on information embedded in a tandem layer in the data, and independent of the constituent payload capacities within the tandem connection.

For the purposes of the present invention, the following definitions are used: A link is a physical connection between any connected nodes; a path is the physical portion of a network between, and defined by, a start point and an end point; and a path can traverse over multiple links.

DETAILED DESCRIPTION

Figure 1:
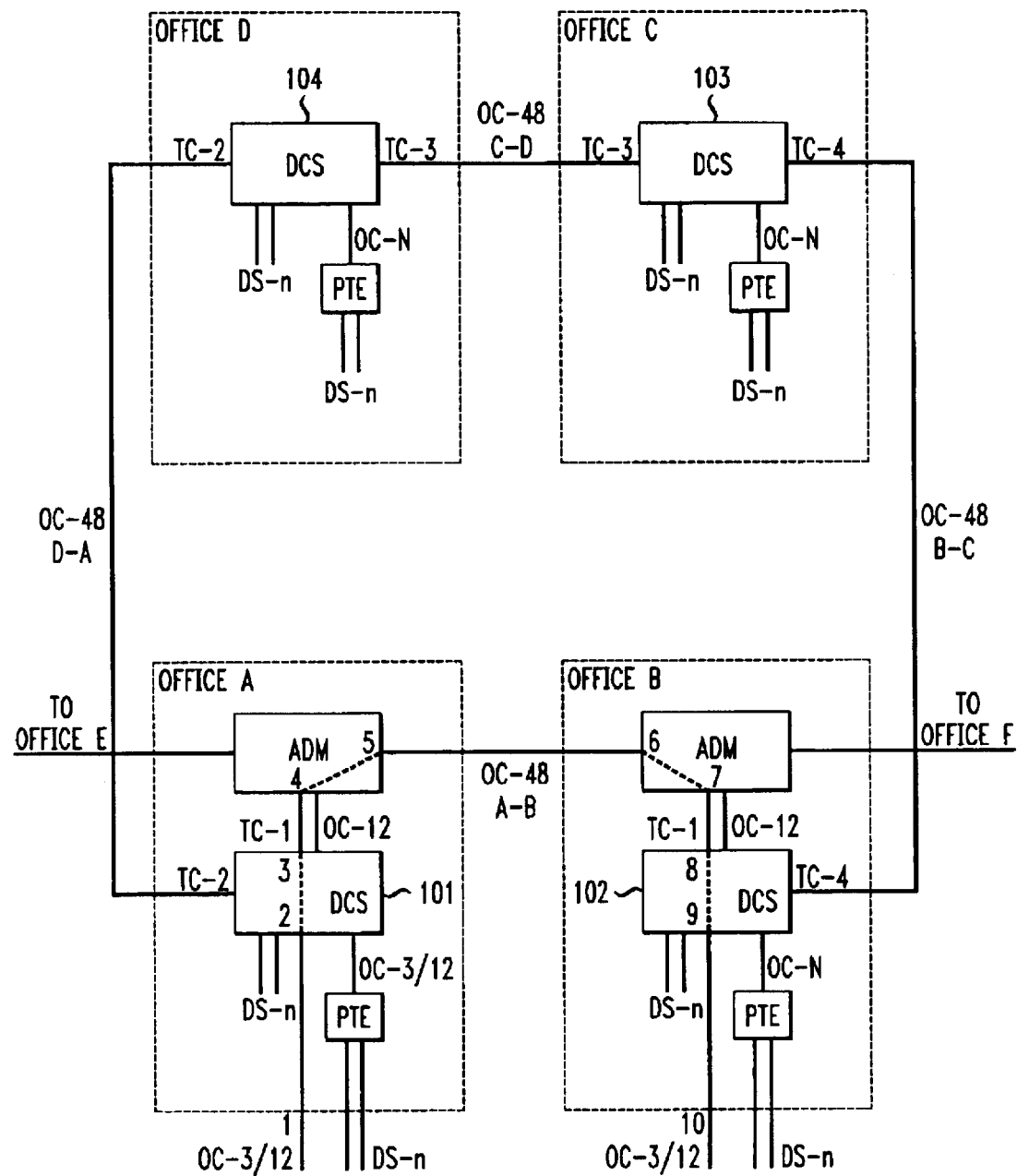
FIG. 1 is a system overview of an embodiment of the present invention featuring a network made up of various Tandem Connection paths between various points.

The present invention relates to routing data over a network. In particular, the present invention relates to using characteristics of SONET to route data along a network.

Where data rerouting is required on an optical network, the complexity and large amount of payload types possible make it extremely difficult to reroute each payload individually. More specifically, as discussed above, fiber-optic networks have the ability to carry a variety of payload types at a variety of data rates, and this ability makes payload rerouting very difficult.

For example, assume a link exists with an OC-48 bandwidth. On this OC-48 link can exist different types of payload bandwidth such as a single STS-1, or 3 STS-1s that are combined into a single payload like STS 12-C. In other words, the OC-48 link can carry a mixture of payloads; so if the link fails, the different bandwidth payloads also fail. To remedy this, instead of searching for these different bandwidths in an alternate route, the present invention provides for maintaining a homogeneous bandwidth that encompasses all the other bandwidths. In other words, a uniform bandwidth is created that will accept any lower-rate bandwidth.

The present invention uses aspects of SONET technology to develop a service independent transport network that can be provisioned, managed, and restored in ways that are independent of payload types in the SONET signals. In a SONET environment, a cross connect can accept data streams from a variety of tributaries, and the data streams can be multiplexed together. Based on this aspect of SONET, in the event of a failure in a network link, the individual payloads need not be individually rerouted; rather, embodiments of the present invention are based on the recognition that a number of payloads can be bundled together into one logical bundle defined by data in the Tandem Connection overhead of a Tandem Connection, and that one logical bundle can be rerouted as such, independent of its constituent payloads. That is, Tandem Connection allows a network to combine various types of payloads into a logical bundle; and once this is done, if there is a fiber cut, each bundle can be rerouted as a complete bundle from one digital cross connect to another, such as from DCS 101 to DCS 102 in FIG. 1, rather than individually rerouting each payload. The Tandem Connection standard provides a map of where the bundle begins, where the bundle ends, and what is in the bundle. The invention takes advantage of that standard to make routing, or rerouting, decisions on the basis of these bundles.

A Tandem Connection can be defined for a single STS payload, or for a bundle of STS payloads, to provide network-level management functions between two path-terminating points. These functions include signal quality, Tandem Connection trace for signal verification, idle signal identification, and testing using test-signal and far-end performance. The Tandem Connection is managed as a single entity between the Tandem Connection terminating points, regardless of the number of STS paths within the Tandem Connection. To do this, a Tandem Connection can use the Z5 path-overhead byte of the first STS path containing the Z5 path-overhead byte for the Tandem Connection layer functions. The first four bits of the Z5 byte are used to calculate the bit-error count within the Tandem Connection. The last four bits are typically used for a datalink between the Tandem Connection terminating points. The datalink carries Tandem Connection maintenance messages, trace, idle signal identification, test-signal identification and far-end performance messages. Because a Tandem Connection cannot change any path-overhead byte, any alterations to the path overhead that are made at the entry point of the Tandem Connection are reconstructed at the Tandem Connection exit point. Thus, the Tandem Connection is transparent to the path overhead. It is this feature that allows a Tandem Connection to provide service-independent, or payload-independent, transport. Once individual payloads are assigned the appropriate path layer, they can be routed through the Tandem Connection as one logical bundle.

Tandem Connection allows for end-to-end network performance management, and allows monitoring of signal integrity within a SONET network. In addition, the Tandem Connection creates a data link between defined endpoints. In particular, Tandem Connection allows a SONET network to treat a variety of incoming data as a single logical entity. When a Tandem Connection is created between two points, the payloads must be provisioned. That is, each payload, or set of payloads, is determined to belong to a specific Tandem Connection. Thus, where a Tandem Connection is employed that relates to multiple payloads between two points, there is already, in essence, a sense of a relationship between those payloads in that particular Tandem Connection. It is this property that allows the Tandem Connection to be used for the new use of transmission restoration.

Having recognized that the individual payloads are associated with one another, i.e., are bundled together, the bundle can be rerouted as a single unit if a link fails. In one embodiment of the present invention, idle bandwidth capacity exists on the Tandem Connection such that the bundled payloads can be provisioned into this idle capacity. The rerouting can be performed in any way known in the art.

Note that the link capacity is divided into predetermined bandwidths, or multiples of a bandwidth. In other words, the bandwidth available over a link is divided up into slots that are associated with a given uniform bandwidth. For example, assume a link exists that is in 48 units of DS-3. Within those 48 units, the data itself can consist of, possibly one $48^{th}$, one $16^{th}$, one $12^{th}$, etc. In the present invention, one fraction of these 48 units can be chosen as the uniform unit for the Tandem Connection. Thus, if one-fourth of the 48 units are chosen as the uniform unit for the Tandem Connection, payloads that require any slot size up to one fourth of the overall 48 units can be rerouted according to the present invention. In this example, multiple payloads can be rerouted along this chosen slot as long as the total bandwidth of the payloads do not exceed the one-fourth unit. Of course, each link can have, as its bandwidth unit, a different bandwidth unit from another link.

As an overview of an embodiment of the present invention, assume there exists an optical network that can carry a variety of payloads between two points along a variety of links on the network. For example, in FIG. 1, for data to travel from digital cross connect system (DCS) 101 to DCS 102, the data can travel along path A-B by traveling along link A-B, or the data can travel along path A-B by traveling along link D-A to link C-D to link B-C and finally to DCS 102. Assume, for the purpose of this example, that the data is being routed from DCS 101 to DCS 102 along link A-B until that path is somehow disrupted. The data can be rerouted from DCS 101 to DCS 102 along path A-D-C-B defined by links that avoid the failed links. Of course, as discussed above, if the path were to be disrupted under the PDH standard discussed in the background, the network would need to reroute the data according to its payload. Because this is an optical network carrying a variety of payloads, this rerouting task is extremely cumbersome. Using an embodiment of the present invention, however, multiple payloads can be rerouted as a single logical unit.

As another example, assume that the network consists of a fiber that carries live traffic. This fiber includes both unused channels and channels used to carry traffic. Now assume that on the network there are four DCS's, or nodes, and that between each of these nodes there is an optical link that carries traffic at, for example, an OC 48 bandwidth (i.e., line rate) (which is equivalent to 48 DS 3s in flow-through capacity). The OC 48 bandwidth can be divided into 4 sets of 12 slots, each set with 12 DS 3 flow-through capacity. Each of these 4 sets of 12 slots can be defined to be a Tandem Connection; thus, the OC 48 bandwidth is divided into 4 Tandem Connections. Using FIG. 1, assume that the network is an OC-48 network. DCS 101 and DCS 102 can be given instructions to maintain 4 bandwidth units of 12 slots each. Thus, when a number of payloads need to be delivered along path A-B, these payload units can be combined into a single logical bundle and be rerouted along the active links, provided the bandwidth needs of the bundled payloads do not exceed 12 slots.

To divide the OC 48 bandwidth into the 4 sets of 12 slots, in this example using FIG. 1, DCS 102 can be sent instructions indicating that the first 12 DS-3 slot numbers 1–12 in the OC-48 line belong to a specific Tandem Connection. To do this, a logic element can reside within DCS 102, for example, and this logic element understands that a Tandem Connection exists between DCS 101 and DCS 102. The Tandem Connection can then be managed using datalink channels in the path overhead. If a Tandem Connection is set up between DCS 101, 104, 103 and 102, these Tandem Connections can be used as standby connections in case of a failure.

To establish a Tandem Connection, an operator at the element management system (EMS) or network management system (NMS) can issue commands to a DCS that tells the DCS to set up a Tandem Connection at the interface port of the DCS. The DCS then establishes the Tandem Connection and in its memory keeps the record of the created Tandem Connection. The port and the DCS control system (that resides within the DCS and controls and manages functions within the DCS) then take other actions necessary for maintaining the Tandem Connection such as performance checking of the Tandem Connection, Tandem Connection ID, etc.

To reroute, the DCS acts analogously to a conventional telecommunications switch. Thus, when a DCS receives commands from outside agents such as an EMS or NMS, or when the DCS's own control system decides that a path must be changed, the DCS determines an alternate route and then directs data accordingly. Because Tandem Connections are used, data can be rerouted independent of payload. That is, using the Tandem Connection overhead, any combination of payloads can be combined and treated as a large entity that contains all the original entities that are rerouted.

In the above example, a homogenous network is created by treating one of the four slots as a network with a uniform Tandem Connection capacity of 12 STS-1s. Note that the same principle can be applied to create a network with Tandem Connections of higher rates. For example, one can create a Tandem Connection with a capacity of 48 STS-1s.

As an additional example, in a large network, a subset of nodes can be connected with only OC-48 or OC-192 links to form a high-capacity backbone network. The high-capacity backbone network can then be managed and restored at, for example, the OC-48 level with Tandem Connections of 48 STS-1s capacity. Additionally, within this same physical network, two independent virtual layers of networks can be created. One of the layers can be a Tandem Connection with 12 STS-1s capacity, and the other layer can be a Tandem Connection with 48 STS-1s capacity. Depending on the ultimate capacity of a network, a variety of layers of Tandem Connections can be established on the network with a variety of bandwidths.

Figure 2:
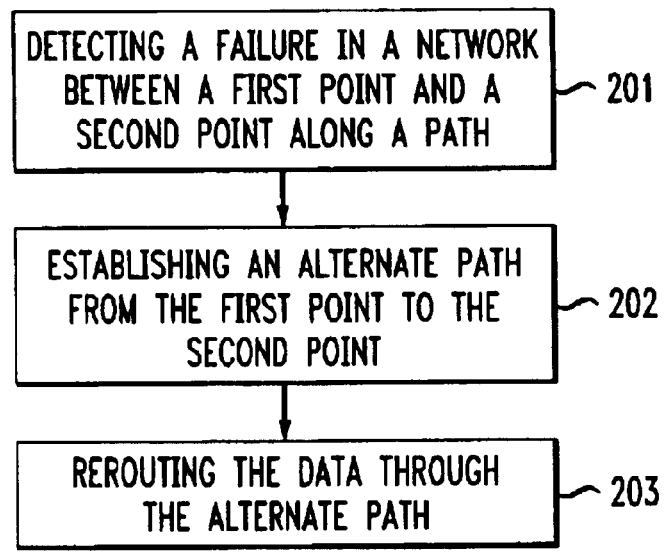
FIG. 2 is a flow chart of a method of routing data over a network having a uniform-capacity Tandem Connection, according to an embodiment of the present invention.

FIG. 2 is a flow chart of a method of practicing the present invention. The steps of the flow chart are not intended to imply a necessary order to the steps; the steps of the method can be implemented in any way practicable. At step 201, a failure is detected in a path between a first point and a second point on the network. At step 202, an alternate path is established between the first point and the second point. In this invention, the alternate path is a uniform-capacity tandem circuit. For example, the alternate path can be a Tandem Connection Circuit with a flow-through capacity of some multiple of DS n capacities. In fact, the flow-through capacity can have the capacity of any multiple of any digital service signal speed. This alternate path can be a series of links connected end to end, each link being a Tandem Connection link; alternatively, the alternate path can be a single Tandem Connection circuit.

At step 203, the data are rerouted through the alternate path based on information embedded in the tandem layer. Because the data are rerouted based on information embedded in the tandem layer, the rerouting can be performed independently of the constituent payload within the Tandem Connection circuit.

The rerouting can be performed in a variety of ways. In one embodiment of the present invention, a central control system that monitors some or all of the DCS nodes on the network can detect if there is a network failure between two or more of the nodes. If a failure is detected, the central control system takes advantage of the idle capacity of each of the nodes by sending the nodes instructions to reestablish the connection between the endpoints of the original path. In another embodiment of the present invention, the nodes can have the capability of communicating with one another. If a node detects a network failure between two or more nodes, the node informs the other nodes that data must be rerouted along an alternate path. The nodes themselves can create the alternate path by using the datalink channel embedded in the Tandem Connection layer to create Tandem Connection cross connects.

Figure 3:
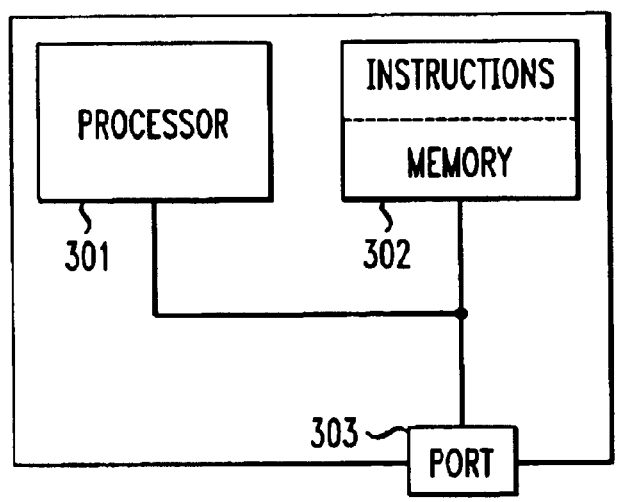
FIG. 3 is a block diagram of an apparatus for routing data over a network having a uniform-capacity Tandem Connection, according to an embodiment of present invention.

FIG. 3 is a block diagram of an apparatus embodiment of the present invention. Processor 301 is coupled to memory 302 and port 303. Memory 302 stores instructions adapted to be executed by processor 301 to perform a method embodiment of the present invention. For example, memory 302 stores instructions adapted to be executed by processor 301 to detect a failure in a network between a first point and a second point along a circuit; establish an alternate circuit from the first point to the second point, the alternate circuit comprising a uniform-capacity tandem circuit; and reroute the data through the alternate circuit, based on information embedded in a tandem layer, and independent of the constituent payload capacities within the tandem connection. The apparatus can reside at a DCS of a central control system.

For the purposes of this application, memory includes any medium capable of storing instructions adapted to be executed by a processor. Some examples of such media include, but are not limited to, RAM, ROM, floppy disks, CDROM, magnetic tape, hard drives, optical storage units, and any other device that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method for use in a network in which a plurality of payloads are routed over a path in accordance with a predetermined protocol, the method comprising:

utilizing a tandem connection layer of said protocol, in response to a failure in a link in the path, to combine and manage said payloads as a single logical entity independent of the different payload capacities of said plurality of payloads and without individually rerouting each payload, the management of said single logical entity being based on information embedded in the tandem connection layer of the protocol.

2. The invention of claim 1 wherein said path has a bandwidth divided into time slots and wherein, prior to said failure, a predetermined number of said time slots were assigned to a tandem connection over which tandem layer logical entities can be rerouted.

3. The invention of claim 1 wherein said predetermined protocol includes a path layer that defines the transport and mapping of services between path terminating equipment in said network and a line layer that provides at least synchronization and multiplexing for the path layer and wherein said tandem connection layer is intermediate between said line layer and said path layer within said protocol.

4. The invention of claim 1 wherein said predetermined protocol is the SONET protocol.

5. The invention of claim 4 wherein said information is embedded in the SONET Z5 path overhead byte.

6. The invention of claim 1 wherein said predetermined protocol is as defined in ANSI T1.105.

7. The invention of claim 6 wherein said tandem connection layer is as defined in ANSI T1.105.05.

8. The invention of claim 1 wherein said tandem connection layer is an ANSI tandem connection overhead layer.

9. An apparatus for routing data packets over a network in which a plurality of payloads are routed over a path in accordance with a predetermined protocol, the apparatus comprising:

(a) a processor;

(b) a port; and (c) a memory coupled to said port and said processor, said memory storing instructions adapted to be executed by said processor to utilize a tandem connection layer of said protocol, in response to a failure in a link in the path, to combine and manage said payloads as a single logical entity independent of the different payload capacities of said plurality of payloads and without individually rerouting each payload, the management of said single logical entity being based on information embedded in the tandem connection layer of the protocol.

10. The invention of claim 9 wherein said path has a bandwidth divided into time slots and wherein, prior to said failure, a predetermined number of said time slots were assigned to a tandem connection over which tandem layer logical entities can be rerouted.

11. The invention of claim 10 wherein said predetermined protocol includes a path layer that defines the transport and mapping of services between path terminating equipment in said network and a line layer that provides at least synchronization and multiplexing for the path layer and wherein said tandem connection layer is intermediate between said line layer and said path layer within said protocol.

12. The invention of claim 11 wherein said predetermined protocol is the SONET protocol.

13. The invention of claim 12 wherein said information is embedded in the SONET Z5 path overhead byte.

14. The invention of claim 12 wherein said predetermined protocol is as defined in ANSI T1.105.

15. The invention of claim 14 wherein said tandem connection layer is as defined in ANSI T1.105.05.

* * * * *